Patented Oct. 19, 1937

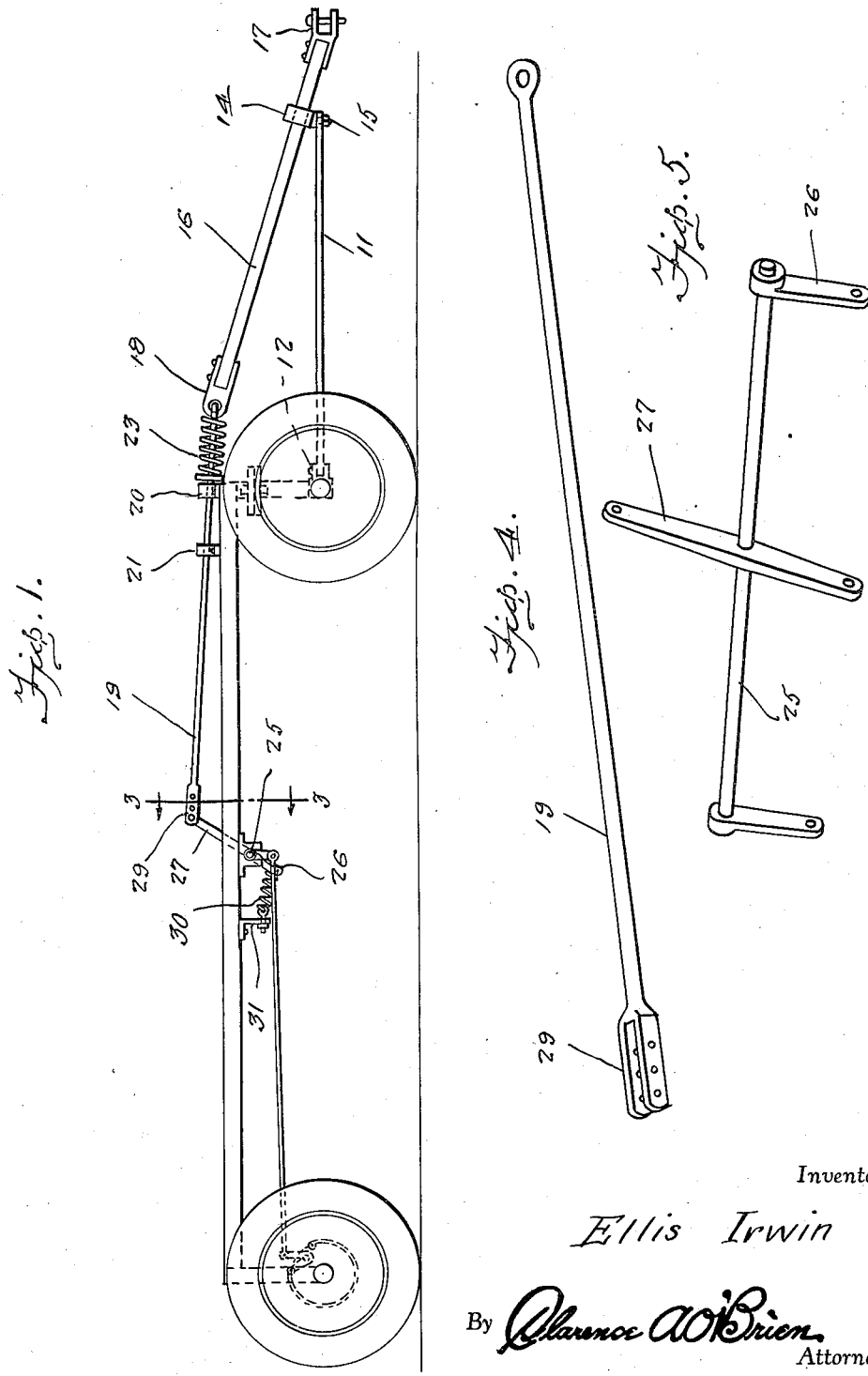

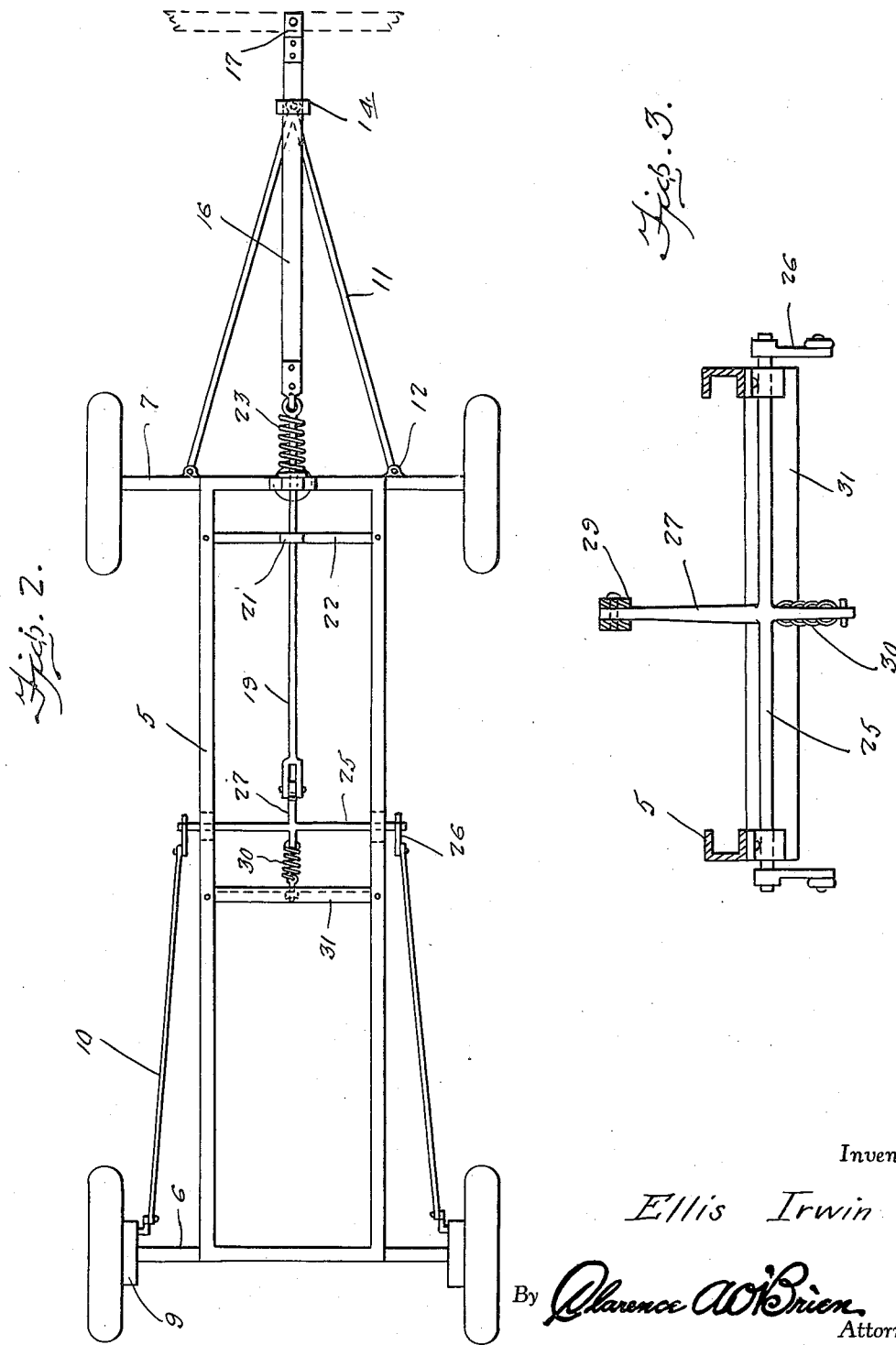

2,096,178

UNITED STATES PATENT OFFICE 2,096,178

BRAKE ACTUATING MECHANISM FOR TRAILERS

Ellis Irwin, Arkansas City, Kans.

Application July 25, 1936, Serial No. 92,628

1 Claim. (Cl. 188—142)

The present invention relates to a mechanism for actuating the brakes on a trailer and the object of the invention resides in the provision of means whereby when the hauling vehicle is moving more slowly than the trailer the brakes of the trailer are applied in an effective manner.

Another very important object of the invention resides in the provision of a mechanism of this nature which is simple in its construction, inexpensive to manufacture and install, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a side elevation of the trailer chassis showing my brake operating mechanism installed thereon.

Figure 2 is a top plan view thereof.

Figure 3 is a vertical transverse section therethrough taken substantially on the line 3—3 of Figure 1.

Figure 4 is a perspective view of a connecting rod.

Figure 5 is a perspective view of a crank shaft showing the crank thereon.

Referring to the drawings it will be seen that numeral 5 denotes the chassis of an automobile trailer, numeral 6 the rear wheel assembly thereof and numeral 7 the dirigible front wheel assembly. Numerals 9 denote the brakes on the rear wheels of the rear wheel assembly. Numerals 10 denote the connecting rods which actuate the brakes 9.

Numeral 11 denotes a tongue extending from the center of the axle of the front wheel assembly and connected therewith on a vertical pivot 12. A loop or sleeve 14 is mounted on the front end of the tongue by suitable means 15 and has its axis obliquely disposed to the tongue 11 so as to diverge upwardly and rearwardly therefrom. A bar 16 is slidable through the sleeve 14 and has a suitable clevis 17 on the front end thereof. An eye block 18 is fixed on the rear end thereof. A rod 19 is engaged with the eye block 18 and extends through a guide 20 on the front of the chassis 5 and also through a guide 21 on a cross bar 22 disposed in the forward portion of the chassis frame 5. A spring 23 is disposed about the rod 19 between the guide 20 and the eye block 18 and urges the rod 19 forwardly in released position as will be more apparent as the description proceeds.

A shaft 25 is journalled across the central portion of the chassis 5. Cranks 26 extend downwardly from the end portions of the shaft 25. A double crank 27 has its intermediate portions fixed to the central portion of the shaft and protrudes in opposite directions therefrom. The rods 10 are engaged with the cranks 26. The rod 19 is adjusably engaged as at 29 with the upper end of the double crank 27. The lower end of the double crank 27 has engaged therewith a spring 30 which is engaged with a suitable cross bracket 31 on the chassis 5 rearwardly of the shaft 25 and tensioned so as to normally hold the brakes 9 in released position.

Obviously, when an automobile or other hauling vehicle is properly engaged with the clevis 17 and is pulling the trailer the brakes 9 are in released position. When the hauling vehicle, however, is moving slower than the trailer then the bar 16 is moved rearwardly against the tension of the spring 23 and moves the rod 19 rearwardly thereby rocking the shaft 25 so as to pull forwardly against the tension of the spring 30, on the connecting rods 10 thereby applying the brakes, of the trailer.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

In a trailer including a chassis frame, wheels having brakes and operating means for said brakes; a lead vehicle control for said brake operating members, said control consisting of a transversely mounted shaft on the chassis frame having crank arms at the ends thereof connected to said brake operating members, a pair of arms disposed in opposite directions on the intermediate portion of the shaft, a cross member on the chassis frame, a spring extending from one of the last-mentioned arms to the cross bar, a rod longitudinally movable of the frame, a pivotal connection between the rear end of the rod and the remaining arm, a leading vehicle attached bar on the front end of the frame, guide means for the bar, guide means on the front end of the frame through which the rod is slidable, and a coiled compressible spring on the forward end of the rod having one of its ends impinging the rear end of the bar and its opposite end impinging the last-mentioned guide means, the forward end of the rod and the rearward end of the bar being loosely connected together.

ELLIS IRWIN.